US009684415B2

(12) United States Patent
Lin

(10) Patent No.: US 9,684,415 B2
(45) Date of Patent: Jun. 20, 2017

(54) OPTICAL TOUCH-CONTROL SYSTEM UTILIZING RETRO-REFLECTIVE TOUCH-CONTROL DEVICE

(71) Applicant: Quanta Computer Inc., Kuei Shan Hsiang, Tao Yuan Shien (TW)

(72) Inventor: Chien-Hung Lin, Tao Yuan Shien (TW)

(73) Assignee: QUANTA COMPUTER INC., Guishan District, Taoyuan (TW)

(*) Notice: Subject to any disclaimer, the term of this patent is extended or adjusted under 35 U.S.C. 154(b) by 0 days.

(21) Appl. No.: 14/458,540

(22) Filed: Aug. 13, 2014

(65) Prior Publication Data

US 2016/0018947 A1 Jan. 21, 2016

(30) Foreign Application Priority Data

Jul. 15, 2014 (TW) .............................. 103124206 A

(51) Int. Cl.
*G06F 3/042* (2006.01)
*G06F 3/0354* (2013.01)
(52) U.S. Cl.
CPC ........ *G06F 3/0421* (2013.01); *G06F 3/03545* (2013.01)
(58) Field of Classification Search
CPC ...... G06F 3/421; G06F 3/0421; G06F 3/0418; G06F 3/0428
USPC ........................................................ 345/175
See application file for complete search history.

(56) References Cited

U.S. PATENT DOCUMENTS

| 6,498,602 | B1* | 12/2002 | Ogawa | G06F 3/0423 178/18.01 |
| 2007/0052692 | A1* | 3/2007 | Gruhlke | G06F 3/0421 345/175 |
| 2011/0234542 | A1* | 9/2011 | Marson | G06F 3/0418 345/175 |
| 2012/0306820 | A1* | 12/2012 | Yu | G06F 3/0421 345/175 |
| 2015/0109258 | A1* | 4/2015 | Chen | G06F 3/0428 345/175 |

FOREIGN PATENT DOCUMENTS

CN 203276195 11/2013

OTHER PUBLICATIONS

Chinese language office action dated Mar. 2, 2016, issued in application No. TW 103124206.

* cited by examiner

*Primary Examiner* — Kwang-Su Yang
(74) *Attorney, Agent, or Firm* — McClure, Qualey & Rodack, LLP

(57) ABSTRACT

An optical touch-control system is provided. The optical touch-control system includes: a display unit; a light source; a retro-reflective touch-control device; at least two image capturing units, and a processor. The image capturing units are configured to capture a plurality of images in front of the display unit, which are generated by the retro-reflective touch-control device reflecting the light emitted from the light source. The processor determines whether at least one first cluster is in the images from the image capturing units based on a first threshold. The processor further calculates a touch position of the retro-reflective touch-control device on the display unit based on the at least one first cluster.

7 Claims, 9 Drawing Sheets

OPTICAL TOUCH-CONTROL SYSTEM UTILIZING RETRO-REFLECTIVE TOUCH-CONTROL DEVICE

CROSS REFERENCE TO RELATED APPLICATIONS

This Application claims priority of Taiwan Patent Application No. 103124206, filed on Jul. 15, 2014, the entirety of which is incorporated by reference herein.

BACKGROUND OF THE INVENTION

Field of the Invention

The present invention relates to an optical system, and, in particular, to an optical touch-control system capable of determining a touch position by using a retro-reflective touch-control device.

Description of the Related Art

With advances in technology, electronic devices having a touch panel, such as a smartphones, smart TVs, laptops, and touch screens, have become more and more popular. However, the electronic devices of some users do not have touch-control functionality, such as conventional LCD/LED TVs or displays. Accordingly, if the users want to perform touch-control functions on their existing electronic devices, they have to buy a new TV or display having touch-control functionality, resulting increased cost to the users.

BRIEF SUMMARY OF THE INVENTION

A detailed description is given in the following embodiments with reference to the accompanying drawings.

In an exemplary embodiment, an optical touch-control system is provided. The optical touch-control system includes: a display unit; a light source; a retro-reflective touch-control device; at least two image capturing units, configured to capture a plurality of images in front of the display unit, which are generated by the retro-reflective touch-control device reflecting the light emitted from the light source; and a processor, wherein the processor determines whether at least one first cluster is in the images from the image capturing units based on a first threshold, wherein the processor further calculates a touch position of the retro-reflective touch-control device on the display unit based on the at least one first cluster.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
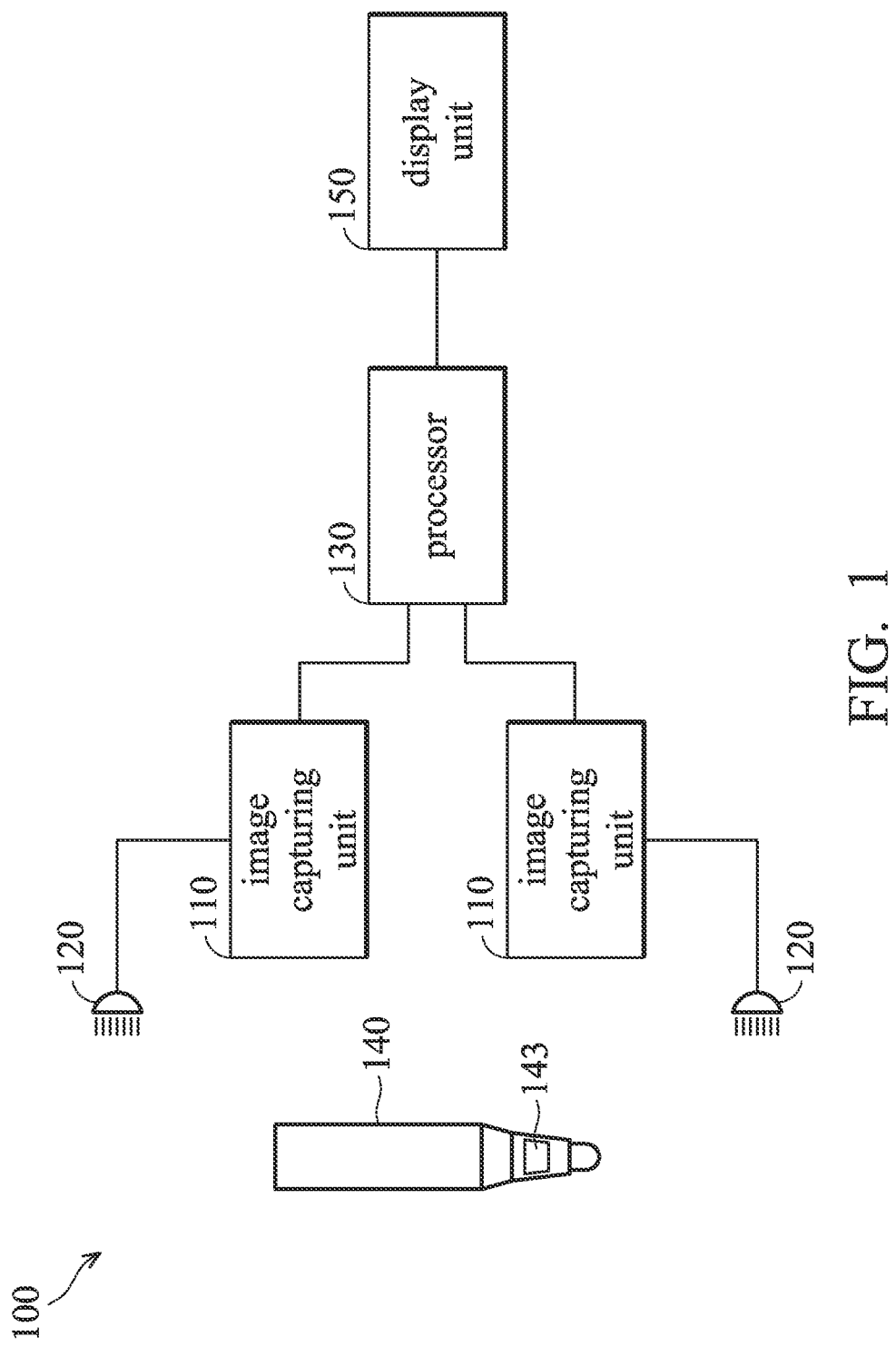
FIG. 1 is a schematic block diagram of an optical touch-control system in accordance with an embodiment of the invention.

FIG. 1 is a schematic block diagram of an optical touch-control system in accordance with an embodiment of the invention. As shown in FIG. 1, the optical touch-control system 100 may comprise at least two image capturing units 110, at least two light sources 120, a processor 130, a retro-reflective touch-control device 140, and a display unit 150, wherein each image capturing unit 110 has an associated light source 120. In an embodiment, each image capturing unit 110 and its associated light source 120 can be integrated into a camera module 200, which can be deployed at a corner or boundary of the display unit 150, where the display unit 150 may be a TV, display, or monitor without touch-control functionality. In an embodiment, each image capturing unit 110 may be an infrared camera, and each light source 120 may be an infrared light source, but the invention is not limited thereto. In an embodiment, the retro-reflective touch-control device (e.g. a retro-reflective stylus) 140 is used for the user to tap on a desired touch position on the display unit 150 (i.e. a touch surface), and the retro-reflective touch-control device 140 may comprise a retro-reflector 143 configured to reflect the light from the light sources 120 (e.g. infrared light), so that the image capturing units 110 may detect the reflected light and capture images. For example, the image capturing units 110 may constantly capture images of a touch object on the surface of the display unit 150. The processor 130 may analyze the captured images from the image capturing units 110 and determine the reflection point (i.e. reflected by the retro-reflector 143) and the touch position on the touch surface.

Figure 2A:
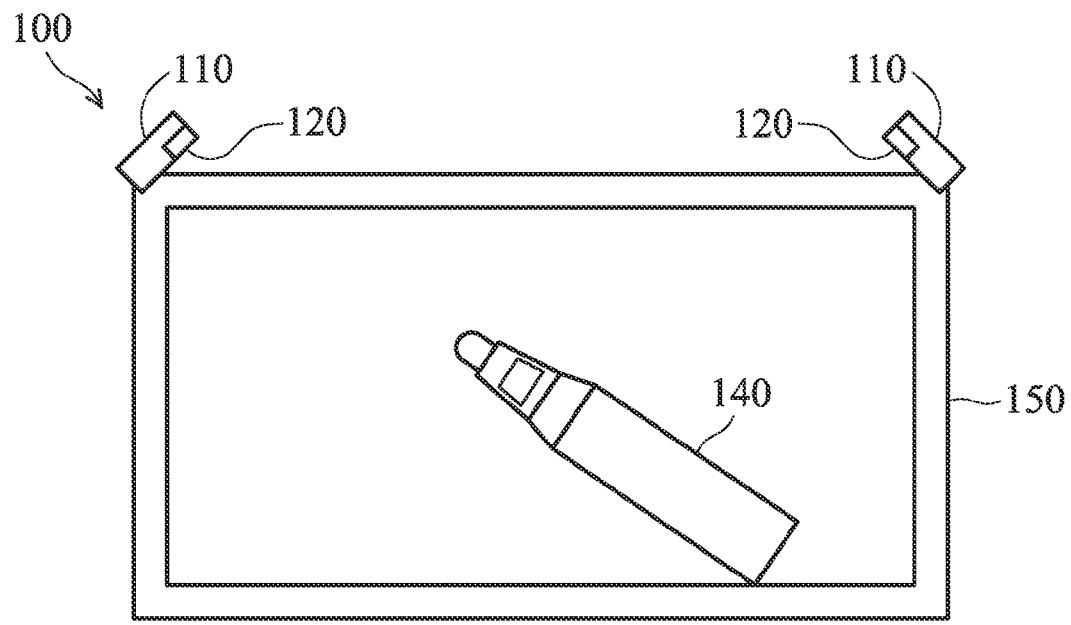
FIG. 2A is a diagram of the optical touch-control system in accordance with an embodiment of the invention.

FIG. 2A is a diagram of the optical touch-control system in accordance with an embodiment of the invention. As shown in FIG. 2A, the camera module 200 comprising the image capturing unit 110 and the light source 120 is deployed on a boundary or corner of the display unit 150, and the optical touch-control system 100 is operated on the touch surface 210 which comprises the viewable region of the display unit 150.

Figure 2B:
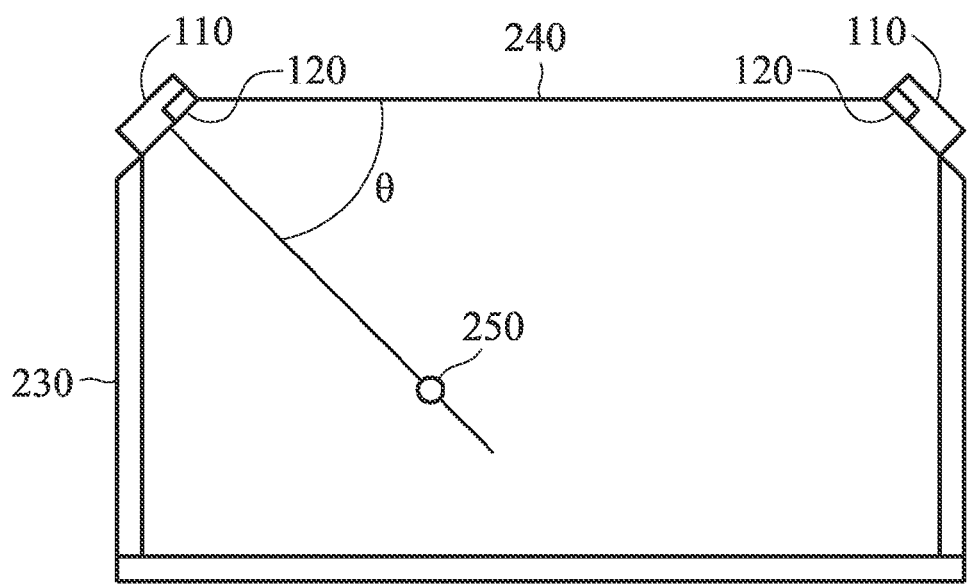
FIG. 2B is a diagram illustrating the capturing of images by the optical touch-control system 100 in accordance with an embodiment of the invention.

FIG. 2B is a diagram illustrating capturing images by the optical touch-control system 100 in accordance with an embodiment of the invention. In an embodiment, as shown in FIG. 2B, each image capturing unit 110 may capture images within a capture range, wherein the boundary of the capture range may be the boundary of the display unit 150. For example, the image capturing unit 110 located at the upper-left corner has a capture range between the boundaries 230 and 240 of the display unit 150. Specifically, the processor 130 may determine the position of the reflection point 250 based on the captured images from the image capturing unit 110, wherein the angle between the boundary 240 of the display unit 150 and the line passing through the reflection point and the image capturing unit 110 is θ, wherein the angle θ may be any angle between the boundaries 230 and 240.

Figure 2C:
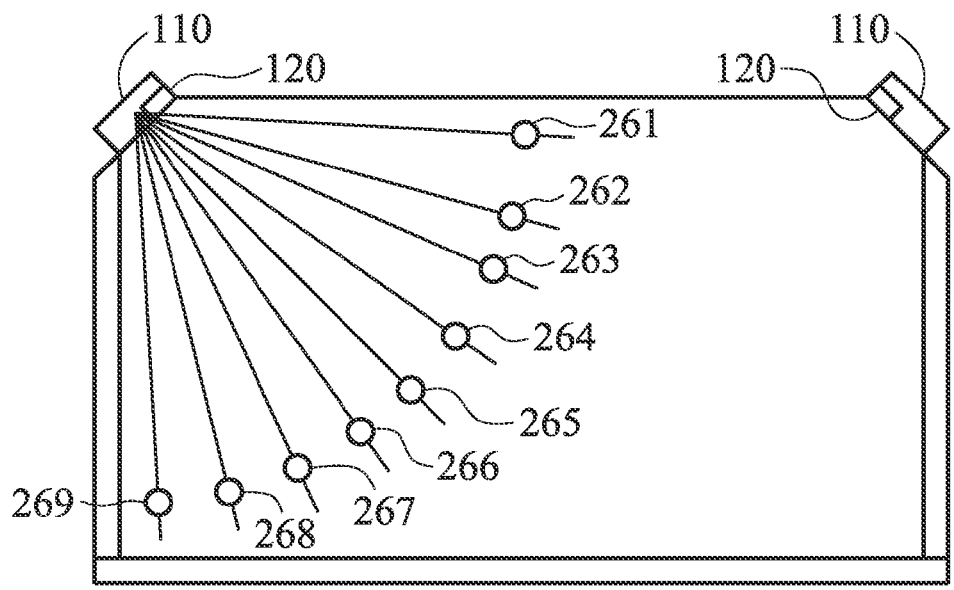
FIG. 2C is a diagram illustrating capturing images by the optical touch-control system in accordance with an embodiment of the invention.

FIG. 2C is a diagram illustrating capturing images by the optical touch-control system in accordance with an embodiment of the invention. In an embodiment, when the optical touch-control system 100 is being calibrated, there are several calibration points at known angles located on the touch surface 210, such as calibration points 260~269, and the touch surface can be divided into ten regions based on different angles. For one having ordinary skill in the art, it will be appreciated that the number of calibration points in the aforementioned embodiment is for description, and the invention is not limited thereto, and the number and positions of the calibration points can be adjusted based on practical conditions. The processor 130 may record the pixel location of each calibration point from the captured images from the image capturing units 110, and establish an angle information database or a look-up table based on the pixel locations of the calibration points.

Figure 2D:
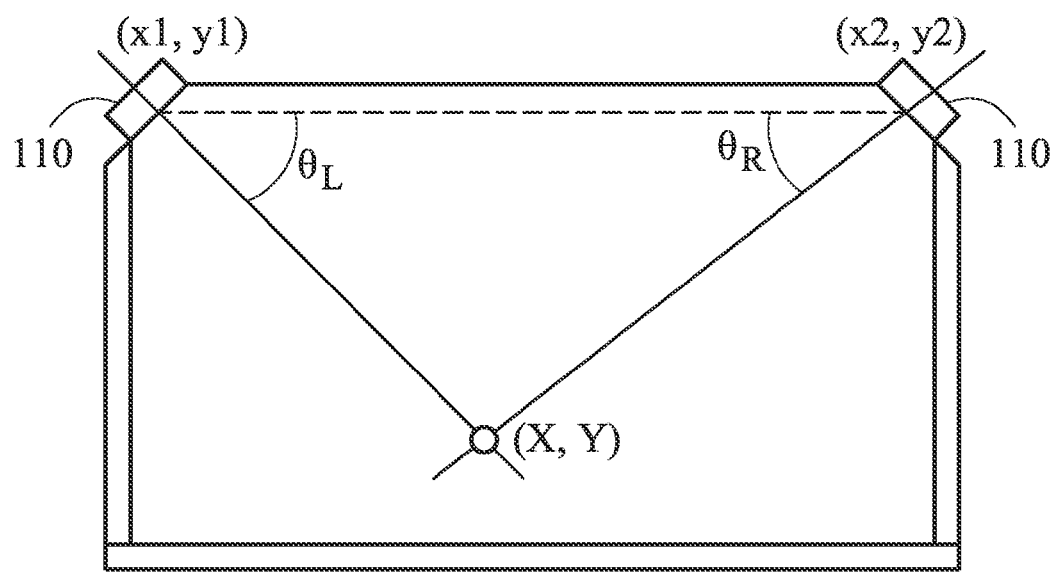
FIG. 2D is a diagram illustrating the calculation of touch positions by the optical touch-control system in accordance with an embodiment of the invention.

FIG. 2D is a diagram illustrating calculation for touch positions by the optical touch-control system in accordance with an embodiment of the invention. For example, referring to FIG. 2C, the upper-left image capturing unit 110 has associated calibration points 261~269, and the touch surface 210 can be divided into ten regions based on different angles relative to the upper-left image capturing unit 110. Similarly, the touch surface 210 can be divided into ten regions based on different angles relative to the upper-right image capturing unit 110. When the processor 130 detects the reflection point from the captured images, the processor 130 may determine the region in which the reflection point is located based on the angle information database or the look-up table. The processor 130 may further determine the angles $\theta_L$ and $\theta_R$ between the boundary 240 and the lines passing through the upper-left/upper-right image capturing units 110 and the reflection points, respectively. Specifically, if the coordinates of the upper-left image capturing unit 110 are (x1, y1), and the coordinates of the upper-right image capturing unit 110 are (x2, y2) and the angles between the reflection point and two image capturing units 110 are known, the coordinates (X, Y) of the reflection point can be calculated by using the trigonometric function or simultaneous linear equations.

Figure 3A:
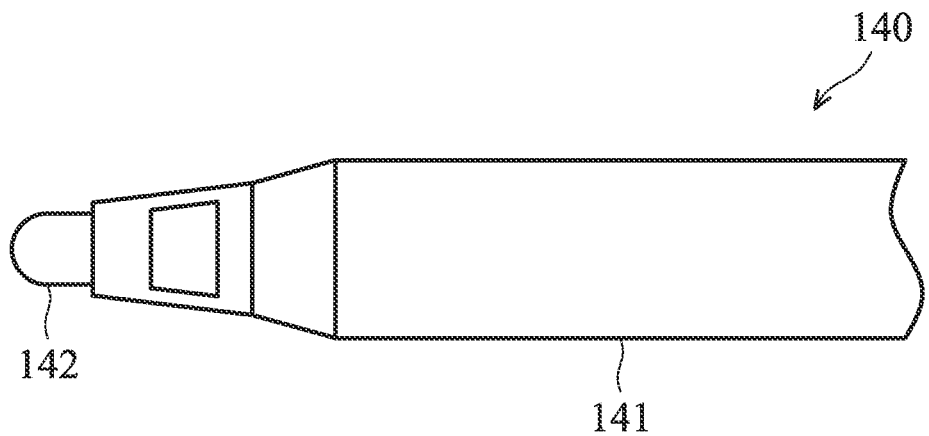
FIG. 3A is a structure diagram of the retro-reflective touch-control device in accordance with an embodiment of the invention.
Figure 3B:
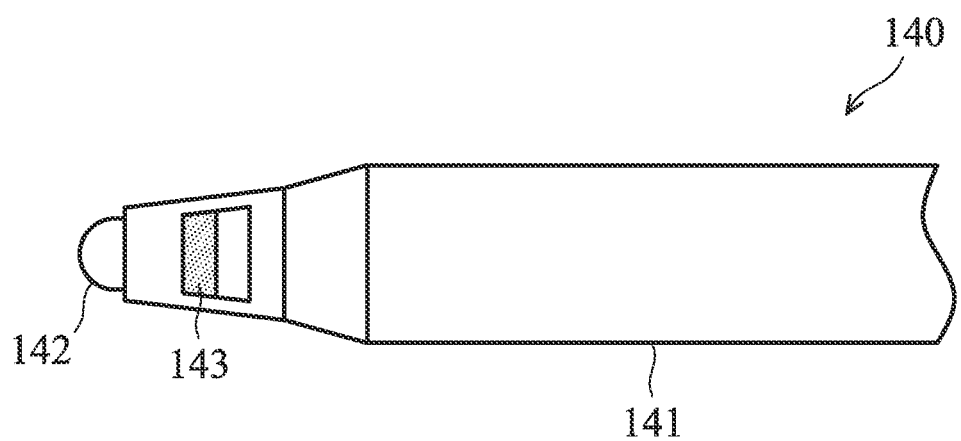
FIG. 3B is a diagram illustrating the retro-reflective touch-control device being pressed in accordance with the embodiment of FIG. 3A.

FIG. 3A is a structure diagram of the retro-reflective touch-control device in accordance with an embodiment of the invention. FIG. 3B is a diagram illustrating the retro-reflective touch-device being pressed in accordance with the embodiment of FIG. 3A. As shown in FIG. 3A, the structure of the retro-reflective touch-control device 140 is a pen, which includes a holding portion 141, a nib portion 142, and a retro-reflector 143. In an embodiment, the retro-reflector 143 is circularly attached on the nib portion 142, and the retro-reflector 143 is covered by a circular structure of the holding portion 141 when the retro-reflective touch-control device is not pressed. For example, a spring is deployed in the holding portion 141. When the user presses the nib portion 142 of the retro-reflective touch-control device 140 (e.g. by pressing on the touch surface), a portion of the nib portion 142 may be pushed into the holding portion 141 so that the retro-reflector 143 is exposed, as shown in FIG. 3B.

Figure 3C:
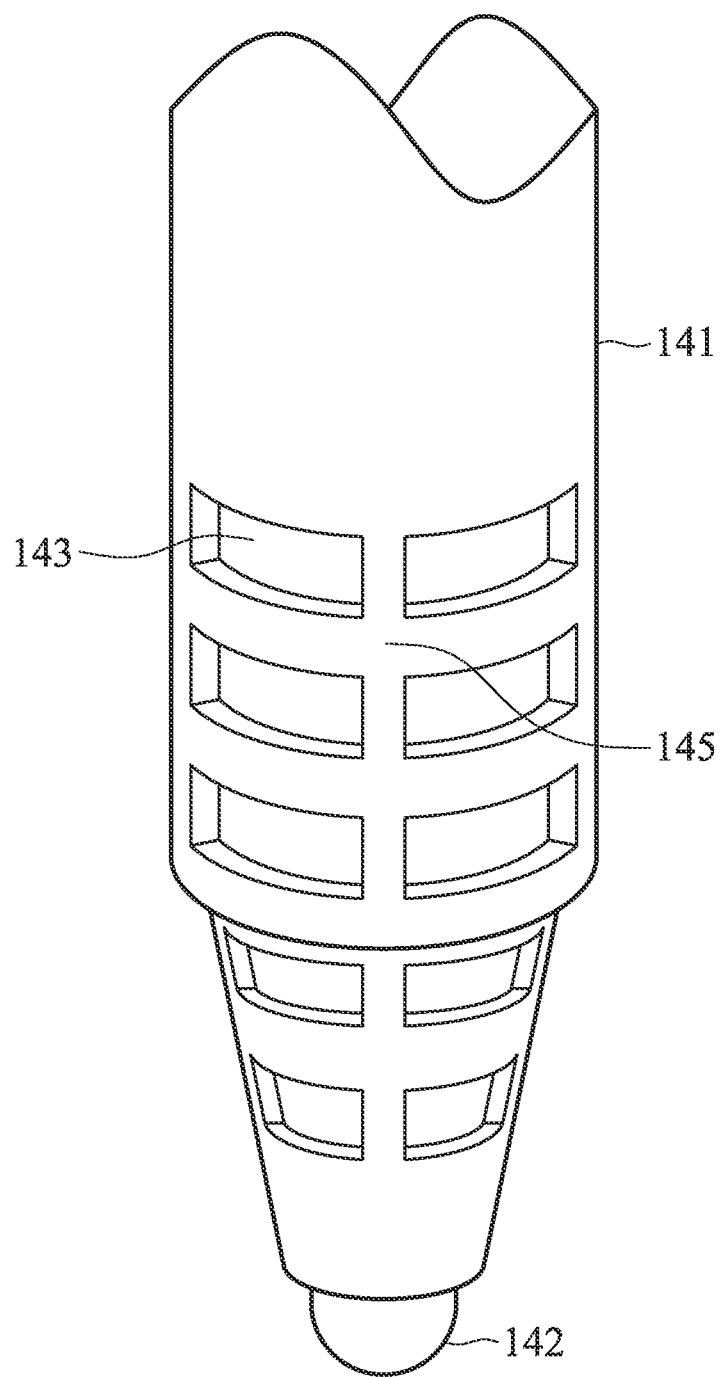
FIG. 3C is a structure diagram of the holding portion of the retro-reflective touch-control device in accordance with an embodiment of the invention.

FIG. 3C is a structure diagram of the holding portion of the retro-reflective touch-control device in accordance with an embodiment of the invention. As shown in FIG. 3C, the holding portion 141 of the retro-reflective touch-control device 140 further comprises a rib structure 145. When the retro-reflective touch-control device is not pressed, the retro-reflector 143 is covered by the rib structure 145. When the user presses the nib portion 142 of the retro-reflective touch-control device 140, the retro-reflector 143 may be exposed at the hollow portion of the rib structure, thereby reflecting the infrared light from the light sources 120. It should be noted that the reflected light from the retro-reflector 143 may be strong when the retro-reflective touch-control device 140 is close to the image capturing units 110. Accordingly, a flare or ghost shadows may occur in the captured images, wherein the ghost shadow may result in lower accuracy and serious jitter while performing touch operations.

Figure 4A:
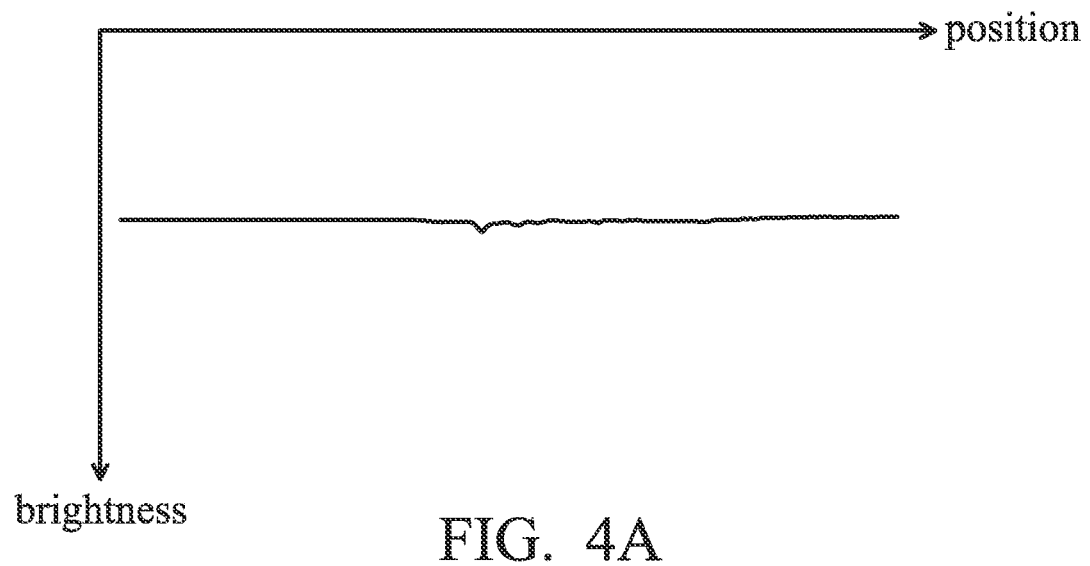
FIG. 4A is a diagram illustrating the initial captured images from the reflected light of the retro-reflective touch-control device in accordance with an embodiment of the invention.
Figure 4B:
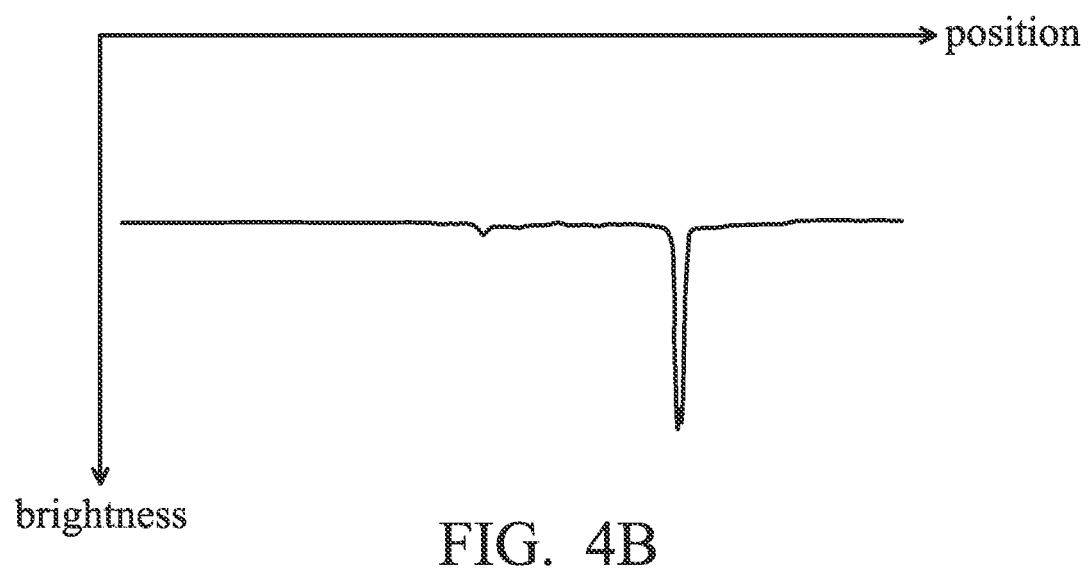
FIG. 4B is a diagram illustrating capturing images from the reflected light of the retro-reflective touch-control device at a remote location in accordance with the embodiment of FIG. 4A.
Figure 4C:
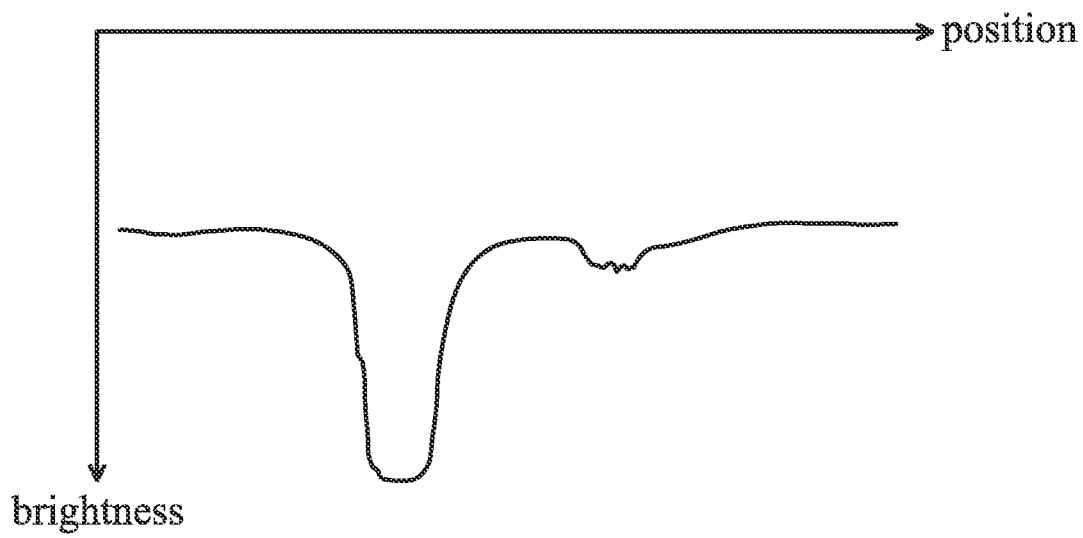
FIG. 4C is a diagram illustrating capturing images from the reflected light of the retro-reflective touch-control device at a close location in accordance with the embodiment of FIG. 4A.

FIG. 4A is a diagram illustrating the initial captured images from the reflected light of retro-reflective touch-control device in accordance with an embodiment of the invention. FIG. 4B is a diagram illustrating capturing images from the reflected light of the retro-reflective touch-control device at a remote location in accordance with the embodiment of FIG. 4A. FIG. 4C is a diagram illustrating capturing images from the reflected light of the retro-reflective touch-control device at a close location in accordance with the embodiment of FIG. 4A. In FIGS. 4A~4C, the vertical direction (Y axis) denotes the brightness of pixels, and the horizontal direction (X axis) denotes the location of pixels, such as the different one-dimensional locations of the points at different angles in FIG. 2C. When the retro-reflective touch-control device 140 is not used, the retro-reflector is not exposed to reflect the infrared light from the light source 120. The initial image (i.e. background images) captured by the image capturing units 110 is shown in FIG. 4A, wherein the brightness of each pixel is kept at a fixed approximate value. When the retro-reflective touch-control device 140 is used at a remote location from the image capturing unit 110, it indicates that the reflection point is far from the image capturing units 110, and the image captured by the image capturing unit 110 is shown in FIG. 4B, wherein the brightness of a majority of the pixels are kept at a fixed approximate value, and the brightness of the reflection point is much higher than that of other pixels. When the retro-reflective touch-control device 140 is used at a location that is close to the image capturing unit 110, it indicates that the reflection point is close to the image capturing units 10, and the image captured by the image capturing unit 110 is shown in FIG. 4C, wherein the brightness of a majority of the pixels are kept at a fixed approximate value, and the brightness of the reflection point, the primary shadow, and the ghost shadow is higher than that of other pixels. In addition, the brightness of the primary shadow is much higher than that of other pixels, and the brightness of the ghost shadow is slightly higher than that of other pixels except the primary shadow.

Figure 4D:
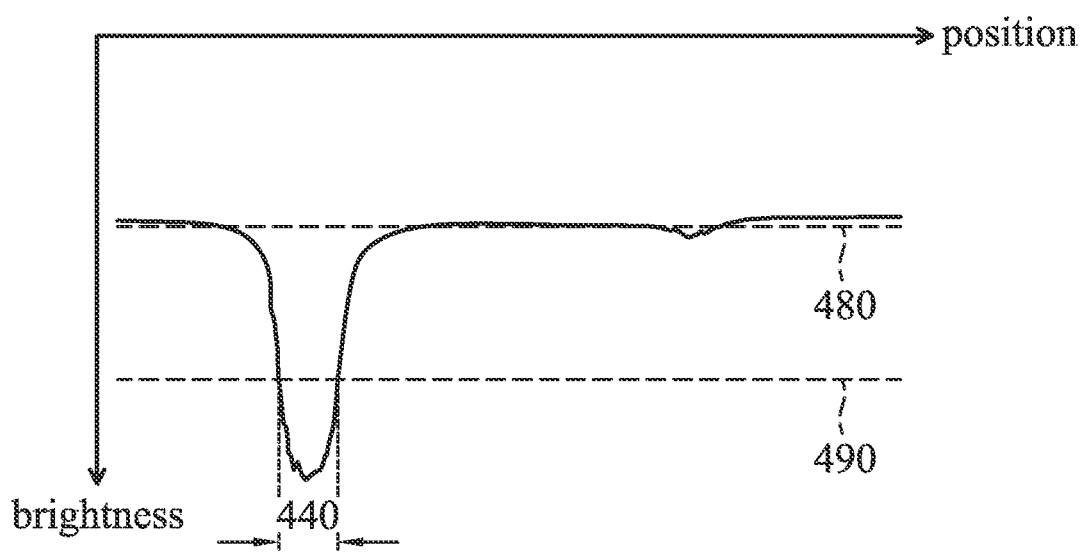
FIG. 4D is a diagram of setting a first threshold in the captured images in accordance with an embodiment of the invention.

FIG. 4D is a diagram of setting a first threshold in the captured images in accordance with an embodiment of the invention. In an embodiment, the processor 130 may filter out the pixels having brightness values lower than a first threshold (e.g. the dashed line 480) in the captured images, thereby eliminating the impact of the ghost shadow and accurately determining the touch position, as shown in FIG. 4D. Specifically, the processor 130 may determine that the pixels having brightness values higher than the first threshold and the second threshold are the primary shadow, which is regarded as the reflection point (touch point).

In another embodiment, an image algorithm using two threshold values is provided to eliminate the impact of the ghost shadow, and the principles to set the threshold values are described as follows: (A) the pixel brightness values of the primary shadow with the increment exceed the first threshold when the primary shadow of the retro-reflective touch-control device is at a remote location from the image capturing units 110; (B) the pixel brightness values of the primary shadow with the increment exceed the second threshold, and the brightness of pixels of the ghost shadow does not exceed the second threshold; (C) pixel brightness values of both the primary shadow and ghost shadow are not between the first threshold and the second threshold, wherein the second threshold is greater than the first threshold.

Specifically, the processor 130 may determine clusters in the captured images. That is, the processor 130 may retrieve regions having pixel brightness values higher than the reference pixel brightness, and the mechanisms of the image algorithm having two thresholds are described as follows: (A) when there is no cluster in the captured image by using the first threshold and the second threshold, it indicates that the retro-reflective touch-control device does not touch on the touch surface; (B) when there is a cluster by using the first threshold and no cluster by using the second threshold, the processor 130 may calculate the coordinate of the touch point by using the cluster associated with the first threshold; (C) when there are clusters by using both the first threshold and the second threshold, the processor 130 may ignore the clusters associated with the first threshold, and calculate the coordinate of the touch point by using the cluster associated with the second threshold.

Figure 4E:
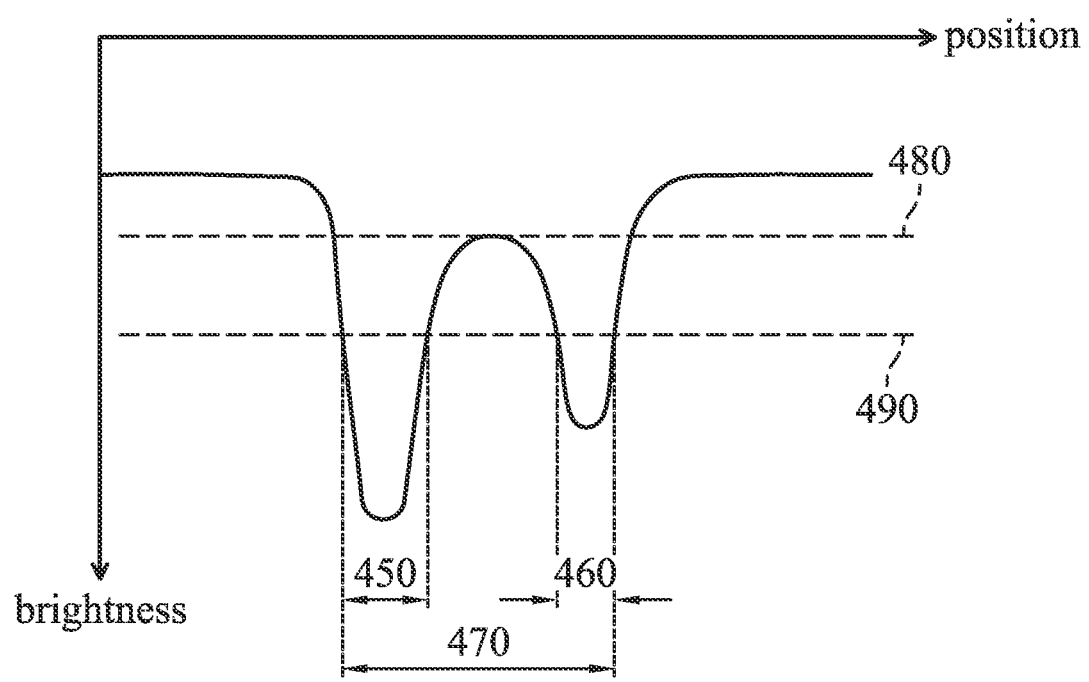
FIG. 4E is a diagram illustrating capturing images by the optical touch-control system in accordance with another embodiment of the invention.

FIG. 4E is a diagram illustrating capturing images by the optical touch-control system in accordance with another embodiment of the invention. In the aforementioned embodiment, since the nib portion 142 of the retro-reflective touch-control device 140 comprises a rib structure, the infrared light reflected by the retro-reflector 143 may be segmented into at least two regions. When the retro-reflective touch-control device 140 is used at a location that is close to the image capturing units 110, it becomes easier to observe the aforementioned segmentation. However, it may result in misjudgment of the touch point since the primary shadow is divided into two regions, such as clusters 450 and 460 shown in FIG. 4E. To solve the aforementioned issue, the processor 130 further uses an image integration algorithm. For example, when the processor 130 determines that there are more than two clusters by using the same threshold (e.g. the second threshold shown as the dashed line 490), the processor 130 may integrate the clusters 450 and 460 into an integrated cluster 470, and the touch position is calculated based on the barycenter of the integral of the integrated cluster 470. In another embodiment, the barycenter of the integrated cluster 470 is calculated based on the region between the left-most and the right-most terminals of the integrated cluster 470.

Figure 5:
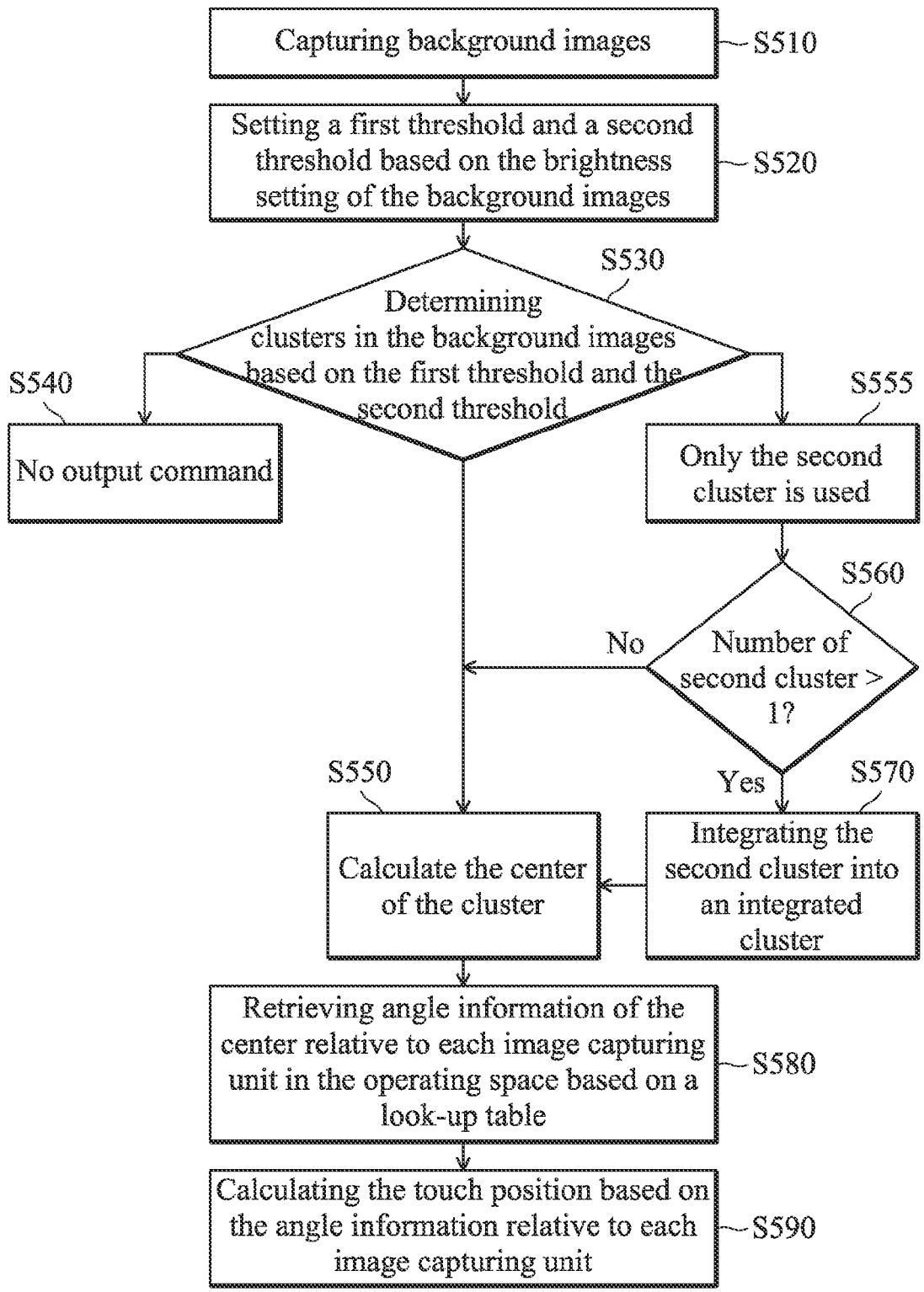
FIG. 5 is a flow chart illustrating a touch-control method in accordance with an embodiment of the invention.

FIG. 5 is a flow chart illustrating a touch-control method in accordance with an embodiment of the invention. In step S510, the image capturing units 110 constantly capture background images. In step S520, the processor 130 sets a first threshold and a second threshold based on the pixel brightness values of the background images, such as a method using a fixed ratio or a fixed offset value being used to set the first threshold and the second threshold. In step S530, the processor 130 determines the status of clusters in the background images based on the first threshold and the second threshold. When the processor 130 determines that there is no cluster in the background images by using the first threshold and the second threshold, it indicates that the retro-reflective touch-control device 140 does not touch the touch surface, and the processor 130 does not generate any output commands (step S540). When the processor 130 determines that there is only a first cluster in the background image by using the first threshold, the processor 130 may calculate the barycenter associated with the first cluster (step S550). When the processor 130 determines that there are at least one first cluster and at least one second cluster in the background image respectively using the first threshold and the second threshold, the processor 130 merely considers the second cluster (step S555), and the processor 130 further determines whether the number of the at least one second cluster is more than one (step S560). If so, the processor 130 may integrate the second clusters into an integrated cluster (step S570), and calculate the barycenter of the integrated cluster (step S550). Otherwise, the processor 130 may calculate the barycenter of the second cluster (step S550).

In step S580, the processor 130 may retrieve angle information of the position of the barycenter relative to the image capturing unit 110 in the operating space based on a look-up table. It should be noted that the processor 130 may perform the aforementioned steps to each image capturing unit 110. In step S590, the processor 130 may calculate the touch position based on the angle information associated with each image capturing unit 110.

In view of the above, an optical touch-control system and a touch-control method are provided. The optical touch-control system can be installed externally on the display unit without the touch-control function, such as a TV, display, or monitor. Accordingly, the aforementioned display unit may have an additional touch-control function, thereby increasing convenience for the user.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An optical touch-control system, comprising:
a display unit;
a light source;
a retro-reflective touch-control device comprising a retro-reflector covered by a rib structure;

at least two image capturing units, configured to capture a plurality of images in front of the display unit, which are generated by the retro-reflective touch-control device reflecting the light emitted from the light source, wherein each image capturing unit is an infrared camera; and a processor, wherein the processor determines whether at least one first cluster is in the images from the image capturing units based on a first threshold, wherein the processor further calculates a touch position of the retro-reflective touch-control device on the display unit based on the at least one first cluster, wherein the processor further determines whether at least one second cluster is in the images from the image capturing units based on a second threshold, wherein when the processor determines that only the first cluster is associated with the first threshold in the images, the processor calculates a barycenter of the first cluster, and wherein when the processor determines that both there is at least one first cluster associated with the first threshold and at least one second cluster associated with the second threshold, the processor further determines whether the number of the at least one second cluster is more than one, if so, the processor integrates the at least one second cluster into an integrated cluster, ignoring the at least one first cluster, and calculates the barycenter of the integrated cluster;

if not, the processor calculates the barycenter of the second cluster ignoring the at least one first cluster.

2. The optical touch-control system as claimed in claim 1, wherein the light source is an infrared light source.

3. The optical touch-control system as claimed in claim 1, wherein the processor sets up the first threshold and the second threshold based on a brightness setting of the images, wherein the second threshold is larger than the first threshold.

4. The optical touch-control system as claimed in claim 1, wherein when the processor determines that there is no first cluster and second cluster in the images based on the first threshold and the second threshold, the processor does not generate any output command.

5. The optical touch-control system as claimed in claim 1, wherein the processor retrieves angle information of the barycenter relative to each image capturing unit in an operating space in front of the display unit based on a look-up table.

6. The optical touch-control system as claimed in claim 5, wherein the processor further calculates the touch position based on the angle information relative to each image capturing unit.

7. The optical touch-control system as claimed in claim 1, wherein the retro-reflective touch-control device is a retro-reflective stylus comprising a holding portion, a nib portion, and a retro-reflector, wherein the retro-reflector is attached on the nib portion and is covered by the holding portion, wherein the retro-reflector is exposed to reflect the light emitted from the light source when the user presses the nib portion on the display unit.

* * * * *